(12) United States Patent
Takanuki et al.

(10) Patent No.: US 7,371,488 B2
(45) Date of Patent: May 13, 2008

(54) METHOD OF MANUFACTURING MAGNETIC HEAD

(75) Inventors: Kazuaki Takanuki, Tokyo (JP); Osamu Shindo, Tokyo (JP); Akimasa Nakao, Tokyo (JP); Masaaki Kaneko, Tokyo (JP); Satoshi Yamaguchi, Tokyo (JP)

(73) Assignees: TDK Corporation, Tokyo (JP); SAE Magnetics (H.K.) Ltd., Shatin (HK)

( * ) Notice: Subject to any disclaimer, the term of this patent is extended or adjusted under 35 U.S.C. 154(b) by 452 days.

(21) Appl. No.: 10/976,916

(22) Filed: Nov. 1, 2004

(65) Prior Publication Data

US 2005/0106506 A1    May 19, 2005

(30) Foreign Application Priority Data

Nov. 14, 2003   (JP)   ............................. 2003-385001

(51) Int. Cl.
*G11B 21/21*   (2006.01)
(52) U.S. Cl. ................. 430/30; 430/320; 29/603.04; 29/603.06; 29/603.1
(58) Field of Classification Search .................. None
See application file for complete search history.

(56) References Cited

U.S. PATENT DOCUMENTS

2005/0121133 A1*  6/2005  Takanuki et al. ............. 156/64

FOREIGN PATENT DOCUMENTS

| JP | 4-17174 | 1/1992 |
|---|---|---|
| JP | 6-150597 | 5/1994 |
| JP | 10-293981 | 11/1998 |
| JP | 2000-123515 | 4/2000 |
| JP | 2001-34905 | 2/2001 |
| JP | 2001-344720 A * | 12/2001 |

OTHER PUBLICATIONS

Computer-generated translation of JP 2001-034905 (Feb. 2001).*

* cited by examiner

*Primary Examiner*—John A. McPherson
(74) *Attorney, Agent, or Firm*—Oblon, Spivak, McClelland, Maier & Neustadt, P.C.

(57) ABSTRACT

Provided is a method of manufacturing a magnetic head with which bonding of a slider and a suspension can be performed by taking an ABS pattern, which determines flying characteristics, as a reference, with no special fabrication required on the slider or the suspension. The method relates to a method of manufacturing a magnetic head for attaching a slider, on which an air bearing surface (ABS) is formed, to a suspension. A surface of the slider on which the ABS is formed is photographed, and the ABS and an engraved region formed within the ABS are identified from the photographed image. Then, a reference that serves as a guide in attaching the suspension is computed, and the slider is attached to the suspension based on the reference. It thus becomes possible for positive pressure and negative pressure that occur in the ABS to be well balanced centered about the suspension, making it possible to stabilize flying attitude and electrical characteristics.

6 Claims, 3 Drawing Sheets

(BEFORE IMAGE PROCESS)

(AFTER IMAGE PROCESS
(AFTER BINARIZED PROCESS))

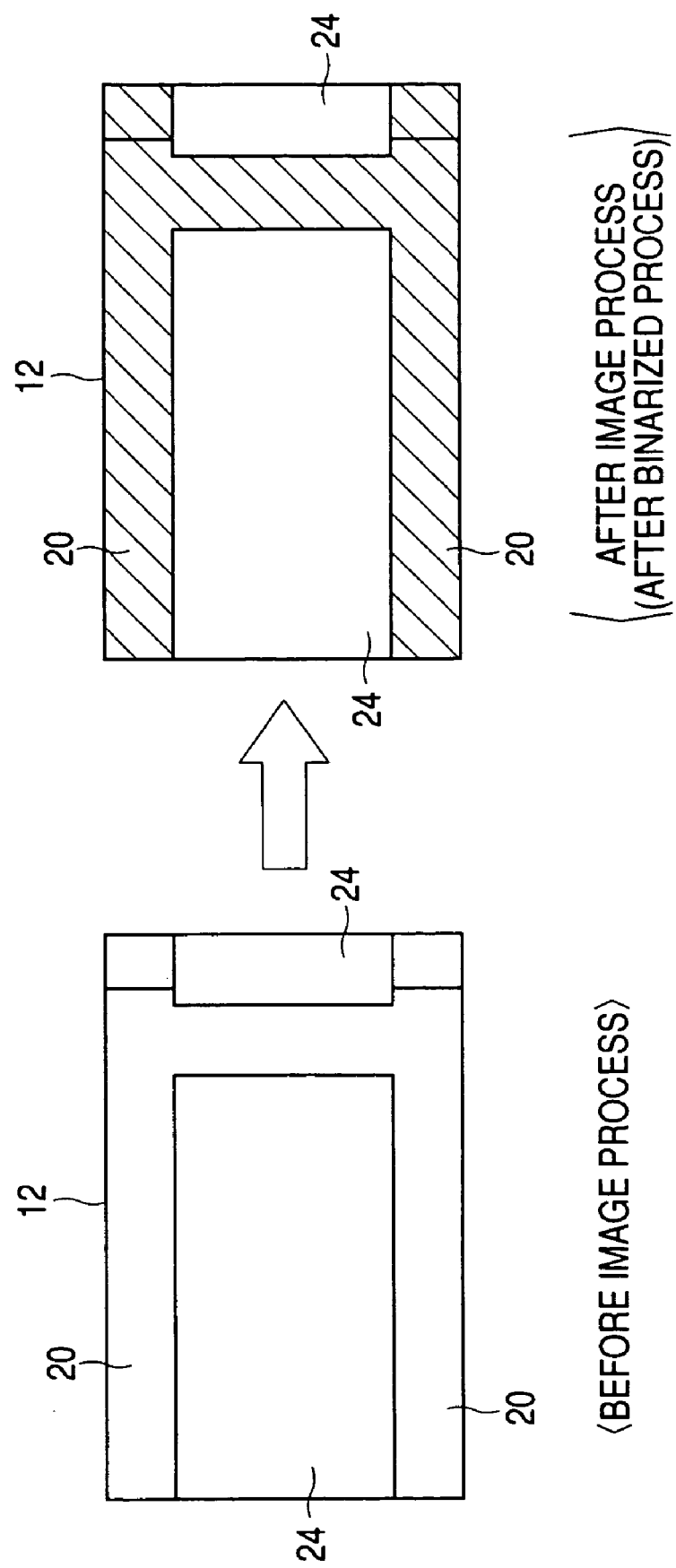

METHOD OF MANUFACTURING MAGNETIC HEAD

BACKGROUND OF THE INVENTION

1. Field of the Invention

The present invention relates to a method of manufacturing a magnetic head. In particular, the present invention relates to a method of manufacturing a magnetic head suitable for attaching a slider to a suspension with good accuracy.

2. Related Background Art

Hard disk drives (hereinafter called HDDs) are increasing in capacity and being made thinner. Together with these advances, magnetic heads (20%, 30% sliders) are also being made smaller.

When bonding a slider, on which a giant magneto-resistive (GMR) element is formed, to a suspension side with conventional processes of manufacturing magnetic heads, positioning of the slider is performed first using the external shape of the slider as a reference. An adhesive agent is applied to a rear surface side of the slider (side opposite to a side where an air bearing surface (ABS) is formed) after positioning the slider, and the slider side is made to contact a distal end of the suspension, which has been positioned by using a tooling hole. The slider side and the distal end of the suspension are bonded through the adhesive.

Methods are also known in which slider positioning is performed without using the external shape of the slider. In one method, a physical positioning portion is provided on the slider, and positioning of the slider to the suspension side is performed by using the positing portion (refer to JP 4-17174 A, for example). In another method, a concave portion that corresponds to the external shape of the slider is provided at the distal end of the suspension, and positioning of the slider is performed by using the concave portion (refer to JP 10-293981 A, for example).

Furthermore, there are also known a method in which a through hole is formed in the slider, and assembly is performed taking the through hole as a positioning reference (refer to JP 2000-123515 A, for example), and a method in which positioning of the slider with respect to the suspension is performed by taking an inner side surface of a rail fabrication portion of the slider as a reference (refer to JP 6-150597 A, for example).

However, problems like those described below exist with the conventional magnetic head manufacturing methods described above.

Namely, it is very important to attach the suspension by taking the ABS formed on the slider as a reference in order to stabilize the flying attitude and the electrical characteristics of the magnetic head across inner and outer circumferences of a disk.

The ABS in the slider is generally fabricated by ion milling, while the external shape of the slider is fabricated by machining, thus forming the ABS and the external shape of the slider through independent processes.

However, positioning between the slider and the suspension is conventionally performed with the external shape of the slider used as a reference, as described above, and the attachment position of the suspension thus does not always coincide with the position found when taking the ABS as a reference, and the fabrication processes differ for the ABS and the external shape of the slider as described above. Consequently, when an inner side surface of the rail fabrication portion of the slider is taken as a reference, the center of the inner side surface may not coincide with the center of the ABS. The designed flying attitude and electrical characteristics may thus not be obtainable.

Accompanying miniaturization of sliders and more complex ABS patterns (in order to stabilize flying characteristics), it is expected that accurately attaching the suspension by taking the external shape of the slider as a reference will become increasingly difficult.

Furthermore, there is a fear that a balance between positive pressure and negative pressure in the ABS will go out of balance, making it impossible to stabilize the flying attitude of the slider, when forming through holes and the like used for positioning in the slider itself.

SUMMARY OF THE INVENTION

Focusing on the conventional problems described above, an object of the present invention is to provide a method of manufacturing a magnetic head in which it is possible to perform bonding of a slider and a suspension by taking an ABS pattern that determines flying characteristics as a reference, with no special fabrication required on the slider or the suspension.

The present invention has been made based on the knowledge that the slider can assume a stable flying attitude (and stable electrical characteristics), by photographing a surface of the slider in which the ABS is formed, computing a position at which the slider is to be attached to the suspension from the photographed image, and attaching the slider to the suspension based on this position information.

That is, a method of manufacturing a magnetic head according to the present invention relates to a method of manufacturing a magnetic head for attaching a slider, on which an air bearing surface (ABS) is formed, to a suspension, the method including: photographing a surface of the slider on which the ABS is formed; identifying the ABS and an engraved region formed within the ABS from a photographed image; computing a reference that serves as a guide in attaching the suspension; and attaching the slider to the suspension based on the reference.

A more specific method of manufacturing a magnetic head relates to a method of manufacturing a magnetic head for attaching a slider, on which an air bearing surface (ABS) is formed, to a suspension, the method including: photographing a surface of the slider on which the ABS is formed; photographing an external shape of the slider; identifying the ABS and an engraved region formed within the ABS from a photographed image; computing a reference that serves as a guide in attaching the suspension; storing as associated information a positional relationship between the reference and the external shape of the slider; measuring, when attaching the suspension to the slider, the external shape of the slider and reading out the reference by checking measured values against the associated information; and attaching the slider to the suspension based on the reference.

The reference may be set as the centroid of the engraved region. The photographing is preferably performed by irradiating ultraviolet (UV) light to the slider, and photographing light reflected from the slider by using a UV light detecting camera.

According to the configuration described above, the ABS side of the slider is photographed, and the engraved region and the other region on the ABS side are identified from the resulting image. In general, the other region is a smooth surface due to polishing, while the engraved region has a rough surface due to ion milling. Consequently, the engraved region and the other region can be easily distinguished from each other from the image provided that binarization process or the like is performed based on a difference in the amount of light reflected from the engraved region and the other region when photographing. After the above process is performed and different regions are distinguished from each other, a reference is computed from the different regions, and a rear surface side of a surface on which the ABS is formed may be attached to the suspension based on the reference.

It is not necessary to remeasure the reference in process steps subsequent to attaching of the slider to the suspension provided that the external shape of the slider is previously measured while computing the reference, and relative positions between the external shape of the slider and the reference are stored as associated information. In addition, it becomes possible to read out the measured slider reference simply by measuring the external shape of the slider, and checking the measured values against the associated information. When the slider is then attached to the suspension based on the read out reference, the attachment can be performed taking the engraved region and the other region as a reference, and a balance between positive pressure and negative pressure that the suspension produces in the slider can be well maintained. It thus becomes possible to stabilize the flying attitude and the electrical characteristics of the slider.

Further, the engraved region is often positioned in a center portion of the slider, and there are times when it becomes possible to accurately set a suspension attachment portion provided that a centroid (center of mass) of the engraved region is taken as a reference.

It should be noted that a step between the engraved region and the other region in the ABS has become smaller in present day magnetic heads in order to make the flying height lower. Accordingly, it is difficult to reliably detect the step because the wavelength of normal visible light is long (that is, the engraved region and the other region cannot be clearly identified). Ultraviolet (UV) light has a shorter wavelength than normal visible light. According to the present invention, the step between the engraved region and the other region, which is difficult to detect by normal visible light, can be reliably detected by irradiating UV light onto the engraved region and the other region, and capturing reflected UV light by a UV light detecting camera. The engraved region and the other region can thus reliably be identified through the irradiation of UV light and capturing of the reflected UV light by the UV light detecting camera. It thus becomes possible to improve the reference precision.

As explained above, according to the present invention, there is provided a method of manufacturing a magnetic head for attaching a slider, on which an ABS is formed, to a suspension, the method including photographing a surface of the slider on which the ABS is formed, identifying the ABS and an engraved region formed within the ABS from a photographed image, computing a reference that serves as a guide in attaching the suspension, and attaching the slider to the suspension based on the reference. Alternatively, there is provided a method of manufacturing a magnetic head for attaching a slider, on which an ABS is formed, to a suspension, the method including photographing a surface of the slider on which the ABS is formed, photographing an external shape of the slider, identifying the ABS and an engraved region formed within the ABS from a photographed image, computing a reference that serves as a guide in attaching the suspension, storing as associated information a positional relationship between the reference and the external shape of the slider, measuring, when attaching the suspension to the slider, the external shape of the slider and reading out the reference by checking measured values against the associated information, and attaching the slider to the suspension based on the reference. Therefore, it becomes possible for positive pressure and negative pressure that occur in the air bearing surface (ABS) to be well balanced centered about the suspension, and a stabilized flying attitude and good electrical characteristics can be obtained.

BRIEF DESCRIPTION OF THE DRAWINGS

FIG. 3 is an explanatory diagram that shows a procedure for distinguishing between an ABS and an engraved region of a slider, where a left side in the figure shows a state before image process, and a right side in the figure shows a state after image process, namely after binarization process.

DESCRIPTION OF THE PREFERRED EMBODIMENTS

Specific preferred embodiments of a method of manufacturing a magnetic head according to the present invention are explained in detail below while referring to the appended drawings.

Figure 1:
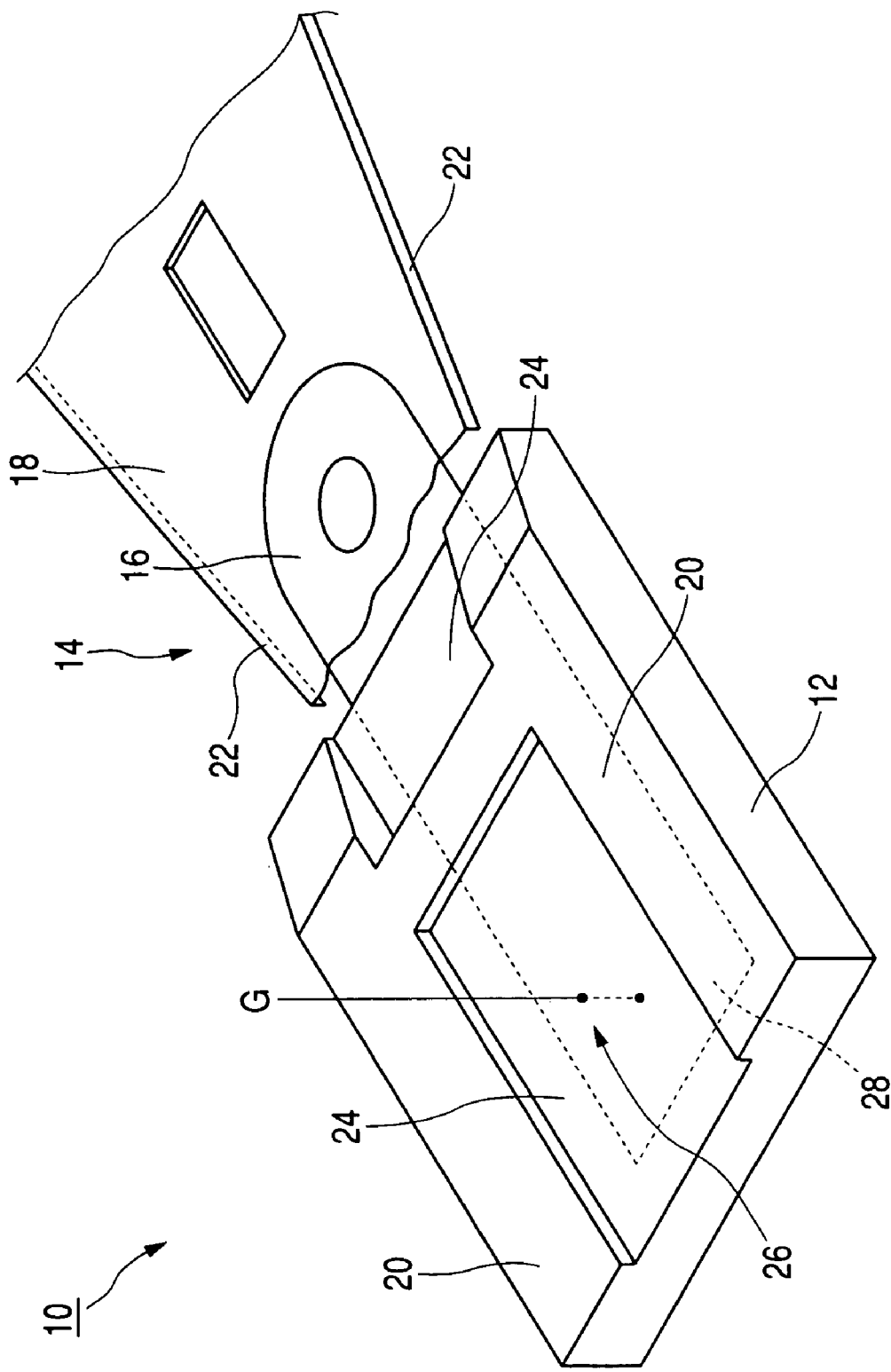
FIG. 1 is a perspective view of a magnetic head that is manufactured by using a method of manufacturing a magnetic head according to an embodiment of the present invention.

FIG. 1 is a perspective view of a magnetic head that is manufactured by using a method of manufacturing a magnetic head according to this embodiment. Referring to FIG. 1, a magnetic head 10 that is manufactured by using the method of manufacturing a magnetic head according to this embodiment includes a slider 12 in which giant magneto-resistive (GMR) element is incorporated, and a suspension 14 that is fixed to the slider 12. The suspension 14 includes a flexure 16 that is bonded and fixed to the slider 12, a load beam 18 that is connected to the flexure 16 by spot welding, and a flexible printed circuit (FPC)(not shown) that provides wirings for the GMP element that is formed on the slider 12.

An ABS is formed on a side of the slider 12 opposed to a magnetic disk (not shown) that is fixed to a spindle motor of an HDD. Positive pressure and negative pressure are generated between the slider 12 and the magnetic disk rotating at high speed due to the ABS, and the slider 12 is made to fly over the magnetic disk at an arbitrary height. The ABS includes an engraved region 24 and an other region 20.

Further, the flexure 16 that is bonded and fixed to the slider 12 is made from a metallic thin sheet, and can deform in an upward and downward direction, a pitch direction, and a roll direction of the slider 12. Magnetic disk surface wobbling, tilting that accompanies assembly, and the like are thus absorbed.

The load beam 18 that is spot welded to the flexure 16 is made from a metallic thin sheet, similar to the flexure 16, and generates a constant load that counterbalances a lifting force on the slider 12 by the urging force of a spring. The slider 12 is thus pressed to a surface of the magnetic disk. It should be noted that a bent piece 22 is provided at either end portion of the load beam 18, thus ensuring rigidity with respect to a seek direction of the HDD (that is, an in-plane direction of the magnetic disk).

With the magnetic head 10 manufactured by using the method of manufacturing a magnetic head according to this embodiment, the ABS and the engraved region 24 that is formed in the ABS by ion milling or the like are identified by image process, and computation is performed with a centroid G26 of the identified engraved region 24 used as a reference point (reference). A dispenser or the like is used to apply an adhesive at a position in a flexure attachment surface 28 in the slider 12 which corresponds to the centroid G26, and attachment of the flexure 16 is performed by taking the centroid G26 as a reference.

By thus bonding the slider 12 and the flexure 16 (namely the suspension 14 side) together by taking the other region 20 and the engraved region 24, which determine the flying attitude of the slider 12, as a reference, it becomes possible to well balance positive pressure and negative pressure of the slider 12 that occur in the vicinity of the flexure 16, to stabilize the flying attitude of the slider 12, and to obtain good electrical characteristics.

A procedure for manufacturing the magnetic head 10 thus configured is explained below.

Figure 2:
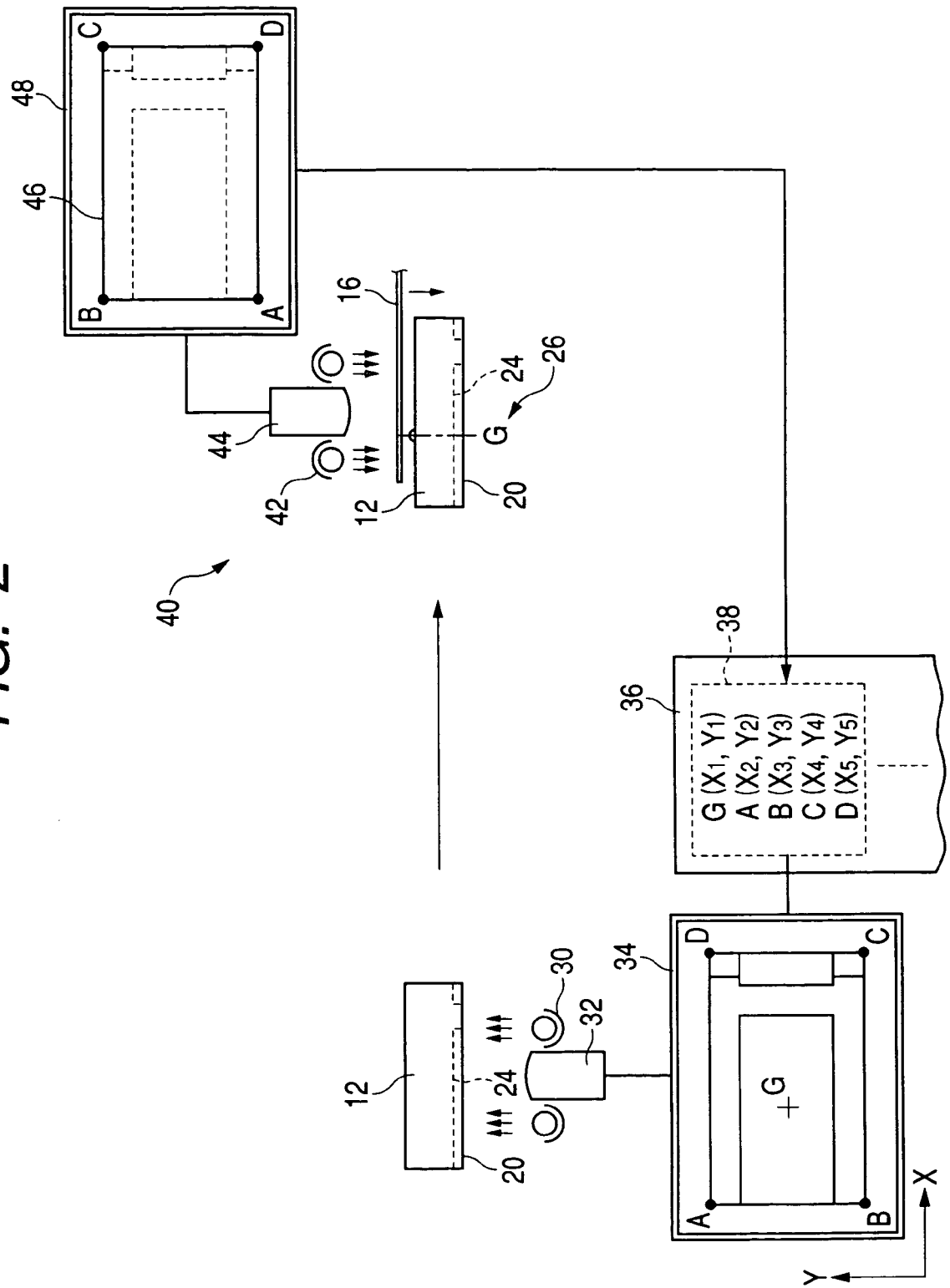
FIG. 2 is a process explanatory diagram that shows the method of manufacturing a magnetic head according to the embodiment of the present invention.

FIG. 2 is a process explanatory diagram that shows the method of manufacturing a magnetic head according to this embodiment.

The other region 20 and the engraved region 24 are formed in the slider by an ion milling process, and then the slider is cut into pieces by using a slicer, before being subjected to the processes shown below.

Referring to FIG. 2, a ring-shaped UV lamp 30 is then made to approach the side of a cut piece of the slider 12 on which the other region 20 and the engraved region 24 are formed. UV irradiation is then performed. A UV light detecting camera 32 is provided in a center portion of the ring-shaped UV lame 30, making it possible to photograph UV light that is reflected by the slider 12. Further, the UV light detecting camera 32 is connected to an image processing means 34 and to a coordinate computing means 36. An image of the slider 12 photographed by the UC light detecting camera 32 undergoes binarization process by the image processing means 34, enabling the other region 20 and the engraved region 24 to be distinguished from each other on the image.

Details of the binarization process performed by the image processing means 34 are shown below.

FIG. 3 is an explanatory diagram that shows a procedure for distinguishing between the engraved region and the other region in the slider, where a left side in the figure shows a state before image process, and a right side in the figure shows a state after image process, namely after the binarization process.

The image taken by the UV light detecting camera as described above is shown in the left side of FIG. 3. The other region 20 is a smooth surface on which polishing has been performed. On the other hand, the engraved region 24 is a rough surface that has been processed by ion milling. Consequently, when the other region 20 and the engraved region 24 reflect light, the reflectivity differs greatly between the other region 20 and the engraved region 24 (that is, the reflectivity of the other region 20 is large, while the reflectivity of the engraved region 24 is small). Accordingly, the other region 20 and the engraved region 24 can be divided into monochrome data values 0 and 1 (in other words, white and black) provided that a slice level is set in advance between the amount of light reflected by the other region 20 and the amount of light reflected by the engraved region 24.

An image that has undergone binarization process based on this concept is shown in the right side of FIG. 3.

It should be noted that UV light is used as irradiation light to the slider 12 in this embodiment. The UV light has a short wavelength compared to that of normal visible light. It is thus possible to reliably capture a step between the other region 20 and the engraved region 24 as light and dark regions. Consequently, the step between the other region 20 and the engraved region 24 can be reliably detected by using the UV light and the UV light detecting camera 32 that detects the UV light, even if the step becomes smaller together with decreases in the amount of flying.

It should be noted that, although the UV lamp 30 and the UV light detecting camera 32 are used in this embodiment as means for detecting the step between the other region 20 and the engraved region 24, other forms may also be used. For example, a measurement method using the laser Doppler principle or the like may also be used (in other words, any method capable of binarization process from the acquired data may be used.)

After the binarization process of the other region 20 and the engraved region 24 is completed, the coordinate computing means 36 computes the centroid G26 of the engraved region 24, and the centroid G26 is used as the reference point.

In addition to computing the centroid G26, the coordinate computing means 36 also computes position information about the external shape of the slider 12 (refer to points A, B, C, and D in FIG. 2, which become the four corners of the slider 12). The coordinate computing means 36 then relates the position information of the centroid G26 to the position information of the external shape of the slider 12, and stores this as associated information 38.

After the coordinate computing means 36 thus records the associated information 38 for the individual pieces of the slider 12, the flexure attachment surface 28 side of the slider 12 (a back surface side of the other region 20 and the engraved region 24) is irradiated with light by a ring-shaped lamp 42 in the next step, namely a step 40 of attaching the slider to the flexure. A light detecting camera 44 provided in a center portion of the ring-shaped lamp 42 photographs light reflected by the slider 12. Position information for the external shape of the slider 12 (refer to the points A, B, C, and D in FIG. 2, which become the four corners of the slider 12) is then detected by an image processing and coordinate computing means 48 from an external shape image 46 of the slider 12 taken by the light detecting camera 44. The coordinates of the centroid G26 can be found by checking the position information for the external shape of the slider 12 against the associated information 38 from the coordinate computing means 38 described above.

After the coordinates of the centroid G26 are found by the image processing and coordinate computing means 48, an adhesive is applied to the flexure attachment surface 28 at the coordinates of the centroid G26 by using a dispenser (not shown). Positioning of the slider 12 and the flexure 16 may then be performed by taking the centroid G26 as a reference, and the bonding of the slider 12 and the flexure 16 may be performed.

It should be noted that, although the centroid of the engraved region 24 is used as the reference point for the explanation in this embodiment, other points may also be used. A reference point may also be computed from the other region 20, and a reference point may also be computed by using a ratio of the surface area between the other region 20 and the engraved region 24, or the like. Methods of computing the reference point may be suitably set according to the specifications of the magnetic head 10, the manufacturing equipment used, or the like. In addition, although a point (reference point) is taken as a reference in this embodiment, there are no limitations in this regard, and a line (reference line) may also be used as the reference when necessary.

This application claims priority from Japanese Patent Application No. 2003-385001 filed Nov. 14, 2003, which is hereby incorporated by reference herein.

What is claimed is:

1. A method of manufacturing a magnetic head for attaching a slider, on which an air bearing surface is formed, to a suspension, the method comprising the steps of:

irradiating the slider with ultraviolet light having a wavelength shorter than a wavelength of a normal visible light;

photographing light reflected from the slider by using a ultraviolet light detecting camera, and obtaining a photographed image which has a contrast and is divided into monochrome data in accordance with a predetermined slice level;

identifying the air bearing surface and an engraved region formed within the air bearing surface from the photographed image;

computing a reference that serves as a guide in attaching the suspension; and attaching the slider to the suspension based on the reference.

2. A method of manufacturing a magnetic head according to claim 1, wherein the reference comprises a centroid of the engraved region.

3. The method of manufacturing a magnetic head according to claim 1, the predetermined slice level is set between an amount of light reflected from the engraved region and an amount of light from the other region of the air bearing surface than the engraved region.

4. A method of attaching a slider having an air bearing surface to a suspension of a magnetic head, the method comprising:

irradiating the slider with ultraviolet light;

obtaining an image by photographing light reflected from the slider by using a ultraviolet light detecting camera;

dividing the image into monochrome data in accordance with a predetermined slice level;

identifying the air bearing surface and an engraved region formed within the air bearing surface based on the monochrome data;

controlling a reference that serves as a guide for attaching the slider to the suspension based on the identified engraved region; and attaching the slider to the suspension based on the reference.

5. The method according to claim 4, wherein the reference comprises a centroid of the engraved region.

6. The method according to claim 4, the predetermined slice level is set between an amount of light reflected from the engraved region and an amount of light from the other region of the air bearing surface than the engraved region.

* * * * *